United States Patent
Bunyan et al.

(10) Patent No.: US 7,471,176 B2
(45) Date of Patent: Dec. 30, 2008

(54) MICRO ELECTROMECHANICAL SYSTEM SWITCH

(75) Inventors: Robert J T Bunyan, Malvern (GB); David J Combes, Malvern (GB); Kevin M Brunson, Malvern (GB)

(73) Assignee: Qinetiq Limited, London (GB)

( * ) Notice: Subject to any disclaimer, the term of this patent is extended or adjusted under 35 U.S.C. 154(b) by 117 days.

(21) Appl. No.: 10/567,732

(22) PCT Filed: Aug. 27, 2004

(86) PCT No.: PCT/GB2004/003711

§ 371 (c)(1),
(2), (4) Date: Feb. 10, 2006

(87) PCT Pub. No.: WO2005/022575

PCT Pub. Date: Mar. 10, 2005

(65) Prior Publication Data

US 2006/0227489 A1    Oct. 12, 2006

(30) Foreign Application Priority Data

Aug. 30, 2003  (GB) .................................. 0320405

(51) Int. Cl.
*H01H 51/22* (2006.01)
(52) U.S. Cl. ..................... 335/78; 200/181; 310/311
(58) Field of Classification Search ............... 335/78; 200/181; 310/311
See application file for complete search history.

(56) References Cited

U.S. PATENT DOCUMENTS

| | | | |
|---|---|---|---|
| 5,463,233 A | 10/1995 | Norling | |
| 5,666,258 A | 9/1997 | Gevatter et al. | |
| 6,057,520 A * | 5/2000 | Goodwin-Johansson | .... 200/181 |
| 6,504,118 B2 * | 1/2003 | Hyman et al. | ............... 200/181 |
| 6,700,309 B2 * | 3/2004 | Dausch et al. | .............. 310/330 |

(Continued)

FOREIGN PATENT DOCUMENTS

DE    42 05 029 C1    2/1993

(Continued)

OTHER PUBLICATIONS

International Search Report of PCT/GB2004/003711, mailed Dec. 10, 2004.

(Continued)

*Primary Examiner*—Elvin G Enad
*Assistant Examiner*—Bernard Rojas
(74) *Attorney, Agent, or Firm*—Oliff & Berridge, PLC

(57) ABSTRACT

A micro electromechanical system (MEMS) switch includes a fixed contact (24) and a moveable contact (35) on an armature (30). The switch has electrodes (22, 34) associated with both the fixed and moveable contacts for providing an electrostatic switch operation and piezoelectric material with associated electrodes (36, 40) for bending the armature upon application of an electric voltage and providing an initial piezoelectric switch operation followed by electrostatic switching and clamping. The armature is of curved shape which is bent away from the fixed contact when in a switch open condition with zero applied voltage. This gives a large, e.g. 3 pm, switch gap in an OFF state which is reduced by piezoelectric operation suitable for electrostatic switch closing. A curved condition is provided by varying strain across the armature thickness, and is produced during manufacture of the switch.

5 Claims, 2 Drawing Sheets

U.S. PATENT DOCUMENTS

| | | |
|---|---|---|
| 7,053,737 B2 * | 5/2006 | Schwartz et al. ............... 335/78 |
| 7,215,064 B2 * | 5/2007 | Mehta ........................ 310/331 |
| 2002/0027487 A1 | 3/2002 | Suzuki |
| 2002/0050882 A1 | 5/2002 | Bogdanoff et al. |
| 2005/0236935 A1 * | 10/2005 | Ohmori et al. ............... 310/328 |
| 2007/0024403 A1 * | 2/2007 | Kwon et al. ................... 335/78 |

FOREIGN PATENT DOCUMENTS

| | | |
|---|---|---|
| JP | 7-14490 | 1/1995 |
| WO | 01/03152 A1 | 1/2001 |
| WO | 01/13457 A1 | 2/2001 |
| WO | 03/028059 A1 | 4/2003 |

OTHER PUBLICATIONS

GB Search Report of GB 0320405.4, dated Feb. 23, 2004.

* cited by examiner

MICRO ELECTROMECHANICAL SYSTEM SWITCH

This application is the U.S. national phase of international application PCT/GB2004/003711, filed 27 Aug. 2004, which designated the U.S. and claims priority of GB 0320405.4, filed 30 Aug. 2003, the entire contents of each of which are hereby incorporated by reference.

The invention relates to a micro electromechanical system (MEMS) switch.

Micro electro mechanical systems (MEMS) are a known class of device typically made by silicon processing techniques in semiconductor materials, and developed as alternatives to conventional electro mechanical devices such as shutters, actuators, relays, valves etc. and thermo mechanical devices such as bimetallic beams.

Examples of such MEMS are used in switches where an electrical contact needs to be made to e.g. a signal line in a microwave system. Two parts of the microwave system need to be connected and disconnected as required by mechanically moving a switch contact on a moveable arm or armature onto and away from fixed stationary contact pad. Electrostatic actuation is a known technique used in MEMS switches. Such actuation provides a force between two conducting objects proportional to the rate of change of capacitance and the square of the applied voltage difference. The force between two charged conductors varies with the inverse square of their separation.

Sticking contacts are frequently the cause of failure in MEMS switch devices. Such stiction may arise from surface interactions at the contact interface such as Van der Waals forces or can be brought about by high current densities or elevated temperatures at the contact ('hot' contact welding). Switches are typically designed to provide sufficient mechanical stiffness to provide a suitable static restoring force.

Careful selection of contact material, and ensuring that the contact has maximum area (for low current densities) goes some way toward minimising the likely stiction force that must be overcome to release the switch, but does not totally eliminate it. The structure could be designed to have a high static mechanical return force under closed conditions, but this tends to lead to a structure which require very high actuation voltages (assuming electrostatic actuation).

Maximum force is obtained from an electrostatic actuator when: the armature contact is in close proximity with the stationary contact, and the armature contact is parallel to the stationary contact.

The need for good isolation characteristics when the switch is in the open position requires that the gap between switch contacts be around 3 µm or more. The requirement for minimum switching time places an upper limit on the size of the armature and the requirement for good return force imposes a lower limit on its stiffness.

Transverse piezoelectric actuation of an armature is another known technique for operating MEMS switches. Such actuation leads to a parabolic curvature of the armature in the region under actuation. The curvature is such that the beam tip deflection varies in direct proportion to the voltage across the piezoelectric layer. Contact forces resulting from piezoelectric actuation tend to be low. It is desirable that contact forces be high to ensure good electrical contact.

The above problems are reduced, according to this invention, by the use of a dual actuation mechanism; namely electrostatic operation in conjunction with piezoelectric, or electrothermal or electromagnetic operation, together with a curvature of the armature.

According to this invention a MEMS switch includes a fixed contact and a moveable contact on an armature characterised by:— electrodes associated with both the fixed and moveable contacts for providing an electrostatic switch operation;

piezoelectric material with associated electrodes for bending the armature upon application of an electric voltage and providing a piezoelectric switch operation;

the armature being of curved shape which is bent away from the fixed contact when in a switch open condition with zero applied voltage;

the arrangement being such that operation of the piezoelectric material bends the armature towards the fixed contact and bends the moveable electrode into both close proximity and substantially parallel alignment with the fixed electrode for clamping of the fixed and movable contacts under electrostatic force.

The invention will now be described, by way of example only, with reference to the accompanying drawings of which:—

Figure 1:
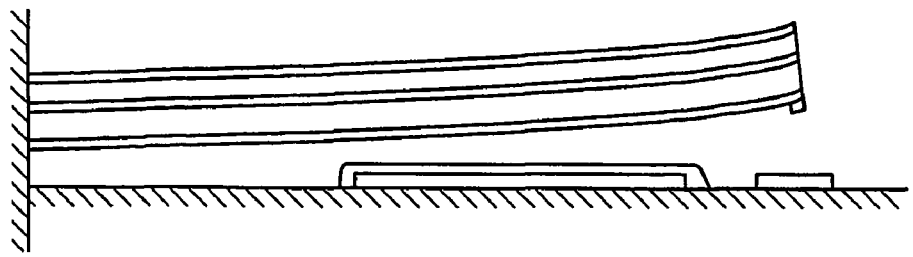
FIG. 1 shows a schematic view of a MEMS switch in its open or zero applied voltage state, and its armature curved away from its fixed contact.
Figure 2:
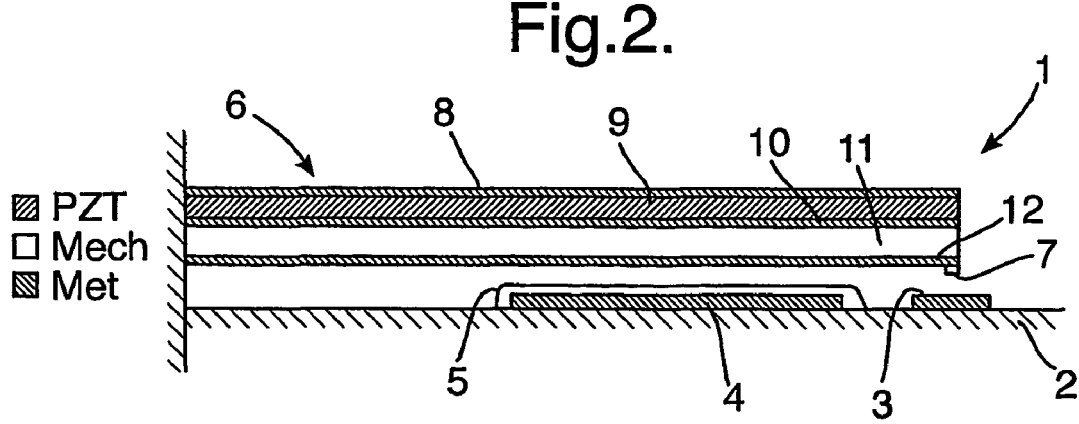
FIG. 2 shows the switch of FIG. 1 in a partly closed state with electrostatic electrodes in a parallel spaced apart position.
Figure 3:
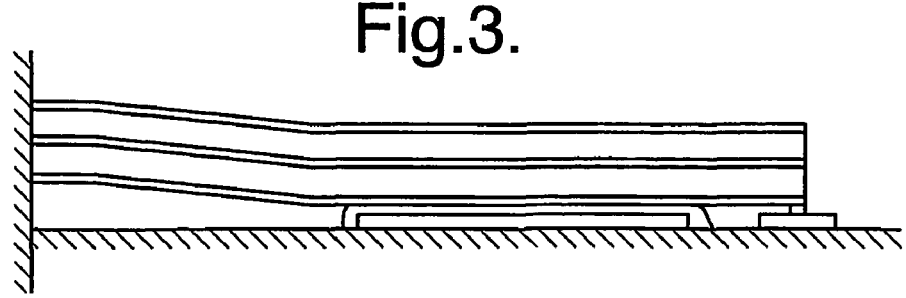
FIG. 3 shows the switch of FIG. 1 in its fully closed condition.

As shown in FIGS. 1-3 a dual electrostatic and piezoelectric actuated MEMS switch 1 comprises a substrate 2 carrying a fixed contact 3 and a lower electrostatic electrode 4 itself coated with a thin insulating layer 5. An armature 6 has one end fixed to the substrate and a free outer end carrying a moveable dimple contact 7. The armature 6 itself is of a sandwich construction, an upper metal layer 8, a piezoelectric layer 9 of PZT, a central metal layer 10, an insulating mechanical layer 11, and a lower metal layer 12 which carries the moveable contact 7.

The switch 1 in its open, voltage off, state is manufactured to have a curved profile as shown in FIG. 1. This curvature is obtained by control of manufacturing steps to give different amounts of stress in the component layers 8-12.

FIG. 2 shows a partly switched state in which voltages have been applied to the electrodes 8, 10 across the piezoelectric layer 9 causing expansion of the layer's length and a consequential straightening of the armature 6. In this condition the armature 6 is straight and both the lower electrostatic electrode 4 and the lower layer 12 (forming a part of the electrostatic actuator) are parallel to one another with a small separation. At this stage the electrostatic electrodes 4, 12 are energised to draw the armature 6 down into the switch closed condition shown in FIG. 3. After closure, FIG. 3, the piezoelectric element 9 is switched off by removing its applied voltage, and the switch remains in a clamped, closed, condition by continued application of a voltage to the electrostatic electrodes 4, 12.

In this closed, FIG. 3, condition component parts of the armature are in a strained state. Thus on removal of the electrostatic switch voltage, the contacts separate as the armature springs back to its free, FIG. 1, condition. If required, a reverse voltage may be applied to the piezoelectric material 9 to assist in bending the armature 6 away from the fixed contact 3.

Typically, MEMS switches operate with measured insertion losses of below 0.2 dB over broadband ranges up to 45 GHz with isolation of >50 dB under 2 GHz.

Figure 4:
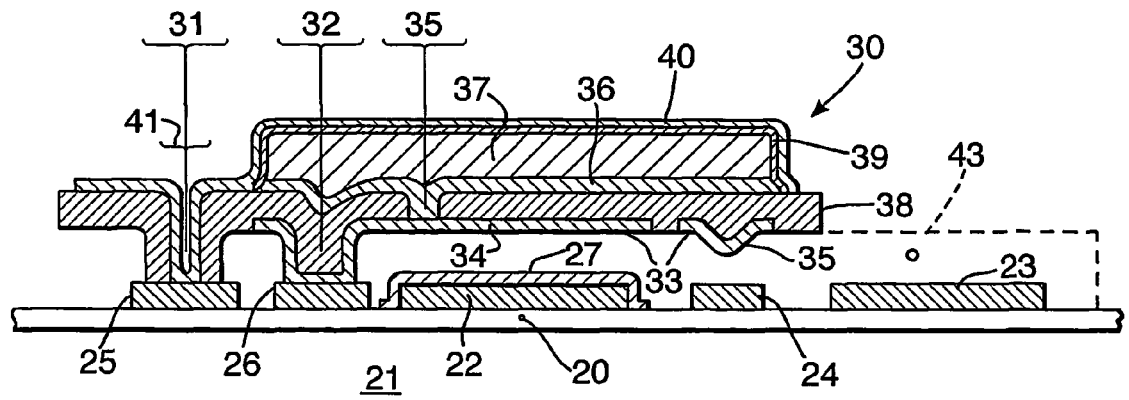
FIG. 4 shows a cross sectional view of a MEMS switch as fabricated before release as in the partly switched state of FIG. 2.
Figure 5:
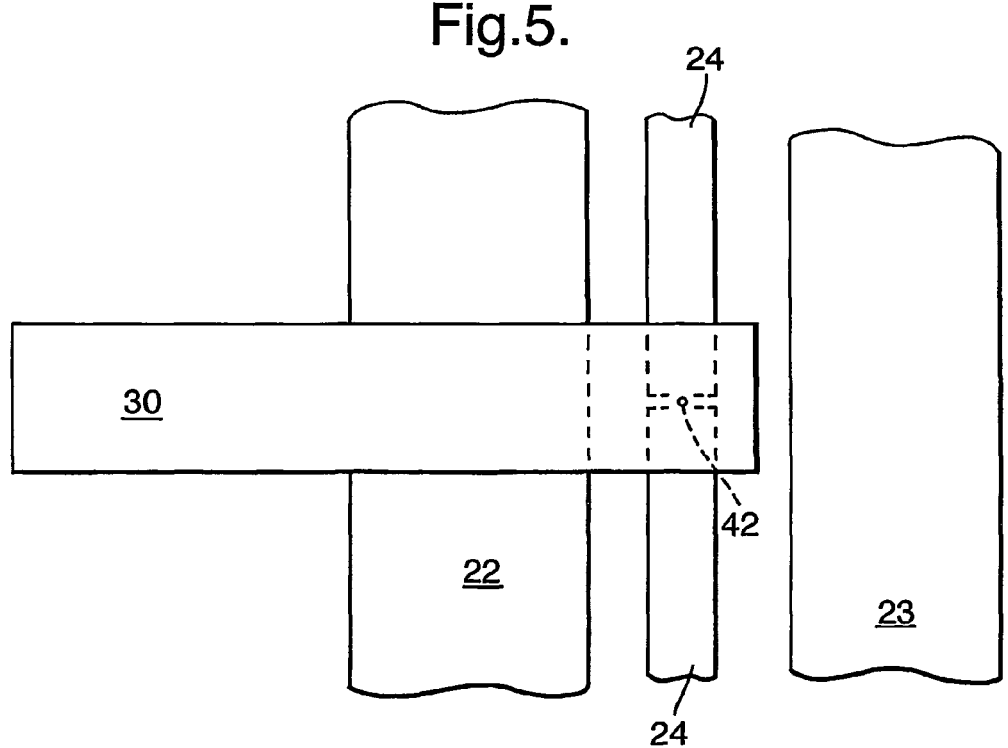
FIG. 5 shows a plan view of the switch of FIG. 4.

A sectional schematic of an example MEMS switch according to the invention 20 is shown in FIG. 4 as fabricated, before release. It is comprises a silicon substrate 21 capped with an electrical isolating layer 20 of silicon dioxide carrying a patterned metal layer including a coplanar waveguide radio frequency transmission line (or CPW) and outer and inner switch electrodes 25, 26 respectively. The CPW includes two ground planes 22, 23 and a transmission line 24. Ground plane 22 is locally covered with a thin e.g. 0.2 μm layer 27 of insulating silicon nitride and forms a lower electrode for electrostatic actuation.

An armature 30 is spaced apart above the substrate 21 with one end fixed on the switch electrodes 25, 26 and the other end free to move up or down under electrical control. The armature 30 is formed by a 1 μm thick layer of silicon nitride carrying on its lower surface a patterned first metal layer 33. This layer 33 is formed into an electrode 34 providing an upper electrostatic electrode and is electrically connected to the inner switch electrode 26. The first metal layer also forms a moveable electrode 35 with dimples arranged to contact either side of a break 42 in the transmission line 24 when the switch is operated. On top of the silicon nitride layer 38 is a second metal layer which connects through a via 35 to the upper electrostatic electrode 34 and is patterned to form a lower electrode 36 under a 1 μm thick layer 37 of lead-zirconate-titanate (or PZT) piezoelectric material. The PZT layer 37 is capped with a dielectric layer 39. Above the piezoelectric layer 37 is an upper piezoelectric actuation electrode 40 which connects to the outer switch electrode 25 through vias 31, 41. The capping layer 39 isolates the lower piezoelectric actuation electrode 36 from the upper piezoelectric actuation electrode 40. Reference number 43 indicates a sacrificial layer, used during processing steps, then removed as described later.

In operation the armature 30 is bent upwards, as in FIG. 1, when in a voltage off condition. To close the switch, voltages are applied to the two anchor electrodes 25, 26 causing the PZT layer 37 to expand and bend the armature 30 into the FIG. 4 state or even lower. In this condition the electrostatic electrodes 22 and 34 are in substantially parallel close proximity. An applied voltage difference between the CPW ground plane 22 and the upper electrostatic electrode 34 causes attraction between electrodes which supplements the downwards movement of the armature until the moveable switch contacts 35 are in contact with the transmission line 24 and the switch is in its closed state. At this point the voltage can be removed from the PZT layer 37 (by removing the signal to the outer anchor pad 25) and the switch remains firmly clamped by electrostatic forces.

To open the switch, the voltage is removed from the electrostatic electrode 26, 34 allowing strain energy stored in the armature 30 to move the moveable contact 35 upwards and out of engagement with the transmission line 24. If necessary, the PZT layer 37 may be reverse biased to contract in length and reinforce the upward movement of the armature 30.

The switch of FIG. 4 may be produced by the following production steps:

All layers are fabricated on commercially available virgin silicon wafers. These are typically boron doped (p-type) with a resistivity of <0.1 Ωcm to allow an optional ohmic metal contact to be made to the substrate 21.

An electrical isolation layer of silicon dioxide film is grown/deposited on the wafers. Contact holes may be etched (e.g. by reactive ion etching, RIE) in this layer to enable a bulk substrate contact to be made in subsequent process steps.

A metal film (components 22-26) is deposited next (e.g. by sputter deposition), and is then patterned using photolithography. In this process, the wafers are coated with photoresist, the photoresist is exposed with the appropriate mask, and the exposed photoresist is developed to create the desired etch mask for subsequent pattern transfer into the underlying layer. After patterning the photoresist, the underlying layer is etched (e.g. by RIE) and the photoresist removed (e.g. by RIE). This sequence of lithography, deposition and etch is repeated to build up a three dimensional (3D) structure on the surface of the wafer. This fixed metal layer forms electrodes interconnects and bond pads.

A thin dielectric layer 27 (such as Silicon Nitride) is deposited (e.g. by Plasma Enhanced Vapour Deposition or PECVD), and patterned using photolithography. This layer protects the fixed metal from unintended electrical contacts and insulates the lower electrostatic electrode 22.

A sacrificial layer 43 (such as polyamide, amorphous silicon etc) is then deposited (e.g. by resist spinning). This layer may provide a degree of planarisation, and is removed in a release process (such as a RIE release or wet etch release process) at the end of the fabrication process to free the structural moving layers forming the armature 30.

Dimples may be formed in the sacrificial layer by photolithography and a timed etch of the sacrificial layer.

Contact holes (31, 32) are etched in the sacrificial layer, to enable electrical and mechanical connections between the moving mechanical layers and the fixed metal layer.

A conducting metal layer (33) is deposited (e.g. by sputtering) and patterned by photolithography next. This layer forms both the upper, movable, electrode 34 for electrostatic actuation, and the conducting layer 35 for RF switching operations.

A mechanical dielectric layer (such as PECVD silicon nitride) is deposited and patterned next. This layer forms the elastic mechanical layer 38 in the switch armature. In plane stresses and out of plane stress gradients may be controlled in this layer as described in [1,2] to enable some control of curvature in the released switch armature. Varying process parameters in the PECVD deposition process (e.g. RF power) allows such control.

A conducting layer is deposited and patterned. This layer forms the bottom electrode 36 for the piezo-electric material layer 37 in the switch. This layer may comprise a combination of conducting layers including non-metals (such as Lanthanum Nickelate) and must provide a suitable surface for nucleation of the appropriate phase in the piezo-electric material layer 37 (e.g. perovskite).

A piezo-electric layer 37 is deposited (e.g. by Metal Organic Chemical Vapour Deposition) and patterned (e.g. by photolithography and RIE).

A thin capping dielectric layer 39 (e.g. PECVD silicon nitride) is deposited and patterned, to prevent unintended electrical contact between the lower piezoelectric electrode 36 and subsequent conducting layers. The stress in this layer may be controlled to enable further control of curvature in the released switch armature.

A third metal layer is deposited and patterned. This layer forms the top piezoelectric electrode 40 and in conjunction with electrode 36 allows an electrical field to be applied across the piezo-electric layer 37. This layer makes contact with the outer anchor pad 25.

A subsequent dielectric layer may be deposited (with controlled stress) and patterned to further control the regions and extent of curvature in the released switch armature.

Following the above process allows for a switch armature to be created with a small sacrificial layer thickness, but which tends to curve upwards over the region of the armature including a piezo-electric layer (but is substantially flat elsewhere). This upward curvature leads to a large gap (>3 microns) between the movable contact 35 switching the RF and the fixed metal layer 24 carrying the RF. This enables good isolation and/or insertion loss to isolation ratio.

REFERENCES

[1] R. J. Bozeat, K. M. Brunson; "Stress control in low temperature PECVD silicon nitride for highly manufacturable micromechanical devices", Micromechanics Europe, Ulvic (Norway), 1998.

[2] R. R. Davies, K. M. Brunson, M. McNie, D. J. Combes; "Engineering In- and Out-of-Plane stress in PECVD Silicon Nitride for CMOS-Compatible Surface Micromachining", SPIE Microfabrication and Micromachining October 2001, California, USA.

The invention claimed is:

1. A micro electromechanical system switch including a fixed contact disposed on a substrate and a moveable contact disposed on an armature, the switch comprising:
   a fixed electrostatic electrode and a moveable electrostatic electrode that provide an electrostatic switch operation;
   a piezoelectric material with associated electrodes that, upon application of electric voltages, provides a piezoelectric switch operation that straightens the armature;
   the armature having a curved shape and being bent away from the fixed contact when in a switch open condition with zero applied voltage;
   wherein, during the piezoelectric switch operation, the piezoelectric material brings the armature and the moveable electrostatic electrode into a substantially parallel alignment with the fixed electrostatic electrode and the fixed contact and the moveable contact are spaced apart, and
   wherein, during the electrostatic switch operation, the fixed and movable contacts are brought into contact and clamped together and the switch is closed under electrostatic force from the electrostatic electrodes.

2. The switch of claim 1, wherein the fixed contact are transmission line contacts and the moveable contact is a switch contact for switching parts of a microwave system.

3. The switch of claim 2, wherein the moveable contact is a switch contact having at least two protuberances that connect two electrically isolated parts of a signal line together.

4. An actuation method for a micro electromechanical system switch comprising the steps of:
   providing a substrate having disposed thereon a fixed metal layer forming a fixed switch contact, electrostatic switch actuation electrodes, a fixed electrostatic electrode, and electrical interconnects;
   providing an armature having a mechanical layer with at least one movable switch contact for electrical switching disposed thereon, a moveable electrostatic actuation electrode, and a layer of piezoelectric material between two electrodes,
   the layers comprising the switch having variable in-plane stress and/or stress gradient across their thickness for causing the armature in a free state to adopt a curved shape bending away from the substrate;
   applying a voltage across the piezoelectric material so as to straighten the armature and bring the moveable electrostatic actuation electrode into a substantially parallel alignment with the fixed electrostatic electrode, the fixed switch contact and the moveable switch remaining spaced apart;
   applying a voltage to the electrostatic actuation electrodes so as to bring the moveable switch contact and the fixed switch contact into contact and clamp the moveable switch contact to the fixed switch contact under electrostatic force to thereby close the switch, and;
   removing the applied voltage from the piezoelectric material.

5. The method of claim 4, wherein the fixed metal layer forms a part of a coplanar waveguide transmission line and the fixed contact is a part of the coplanar waveguide transmission line.

* * * * *